United States Patent
Streuli et al.

(10) Patent No.: US 12,544,328 B2
(45) Date of Patent: Feb. 10, 2026

(54) HAIR STYLING COMPOSITIONS COMPRISING POLYGALACTOMANANS, AND METHOD FOR USING THE SAME

(71) Applicant: ISP INVESTMENTS LLC, Wilmington, DE (US)

(72) Inventors: David C. Streuli, Wayne, NJ (US); Gijsbert Kroon, Giessenburg (NL); Cristina Rae Ventura, Westfield, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 23 days.

(21) Appl. No.: 17/043,970

(22) PCT Filed: Apr. 1, 2019

(86) PCT No.: PCT/US2019/025101
§ 371 (c)(1),
(2) Date: Sep. 30, 2020

(87) PCT Pub. No.: WO2019/191747
PCT Pub. Date: Oct. 3, 2019

(65) Prior Publication Data
US 2021/0121387 A1   Apr. 29, 2021

Related U.S. Application Data

(60) Provisional application No. 62/650,747, filed on Mar. 30, 2018.

(51) Int. Cl.
*A61K 8/73*        (2006.01)
*A61K 8/04*        (2006.01)
(Continued)

(52) U.S. Cl.
CPC .............. *A61K 8/737* (2013.01); *A61K 8/042* (2013.01); *A61K 8/046* (2013.01); *A61K 8/731* (2013.01);
(Continued)

(58) Field of Classification Search
None
See application file for complete search history.

(56) References Cited

U.S. PATENT DOCUMENTS

| | | |
|---|---|---|
| 5,523,079 A | 6/1996 | Gough |
| 6,306,377 B1 | 10/2001 | Coppola et al. |

(Continued)

FOREIGN PATENT DOCUMENTS

| | | | | |
|---|---|---|---|---|
| AU | 2011224144 A1 | * 10/2011 | ............. | A01N 25/16 |
| CA | 2713263 A1 | * 8/2009 | ............. | A61K 8/416 |

(Continued)

OTHER PUBLICATIONS

JP2012126805. Eng Tran. Published: Jul. 2012.*
(Continued)

*Primary Examiner* — Nicole P Babson
*Assistant Examiner* — Lori K Mattison
(74) *Attorney, Agent, or Firm* — Aseem V. Mehta; Nathalie Tietcheu

(57) ABSTRACT

A hair styling composition comprising at least one cationically modified polygalactomannan having a molecular weight in a range of from about 40 to about 1100 KDa and at least one cosmetic ingredient is disclosed. Also disclosed is a method of use thereof and a process for preparing the same.

1 Claim, 7 Drawing Sheets

(51) Int. Cl.
  *A61K 8/81* (2006.01)
  *A61Q 5/06* (2006.01)
(52) U.S. Cl.
  CPC .......... *A61K 8/8135* (2013.01); *A61K 8/8182* (2013.01); *A61Q 5/06* (2013.01); *A61K 2800/524* (2013.01); *A61K 2800/5426* (2013.01); *A61K 2800/596* (2013.01)

(56) References Cited

U.S. PATENT DOCUMENTS

| | | | |
|---|---|---|---|
| 6,685,952 B1 | 2/2004 | Ma et al. | |
| 7,262,157 B2 | 8/2007 | Utz et al. | |
| 7,601,340 B2 * | 10/2009 | Nojiri | A61K 8/4973 424/70.28 |
| 8,044,156 B2 | 10/2011 | Tamareselvy et al. | |
| 8,815,224 B2 | 8/2014 | Glynn, Jr. et al. | |
| 9,643,031 B2 | 5/2017 | Chan et al. | |
| 9,782,609 B2 | 10/2017 | Franzke et al. | |
| 2005/0129643 A1 * | 6/2005 | Lepilleur | A61K 8/898 424/70.1 |
| 2006/0045861 A1 * | 3/2006 | Bejger | A61Q 19/10 424/70.13 |
| 2008/0044362 A1 * | 2/2008 | Brown | A61K 8/27 424/47 |
| 2010/0284955 A1 | 11/2010 | Lepilleur et al. | |
| 2012/0291796 A1 | 11/2012 | Ueno | |
| 2013/0034515 A1 | 2/2013 | Stone et al. | |
| 2013/0129639 A1 | 5/2013 | Anderson et al. | |
| 2015/0239993 A1 * | 8/2015 | Miyoshi | C08B 11/145 424/70.13 |
| 2016/0008257 A1 | 1/2016 | Zhou et al. | |
| 2019/0231672 A1 * | 8/2019 | Li | A61K 8/463 |

FOREIGN PATENT DOCUMENTS

| | | | | |
|---|---|---|---|---|
| CN | 107115222 A | | 9/2017 | |
| CN | 105793273 | | 2/2020 | |
| EP | 1566162 A1 | | 8/2005 | |
| EP | 1216017 B1 | | 9/2007 | |
| EP | 1997476 A1 | | 12/2008 | |
| EP | 3498257 A1 * | | 6/2019 | A61K 8/11 |
| FR | 2718962 A1 | | 10/1995 | |
| FR | 2729853 A1 | | 8/1996 | |
| JP | 1993-345708 A2 | | 12/1993 | |
| JP | 2007091968 A * | | 4/2007 | |
| JP | 2012126805 A * | | 7/2012 | A61K 8/36 |
| JP | 2017210416 A * | | 11/2017 | A61K 8/44 |
| WO | WO1999066888 A1 | | 12/1999 | |
| WO | WO2001085105 A1 | | 11/2001 | |
| WO | WO2002060397 A1 | | 8/2002 | |
| WO | WO2012170171 A1 | | 12/2012 | |
| WO | WO-2014027120 A2 * | | 2/2014 | A61K 8/19 |
| WO | WO2015095677 A1 | | 6/2015 | |
| WO | WO-2018007332 A1 * | | 1/2018 | A61K 8/064 |

OTHER PUBLICATIONS

JP2017210416 Eng Tran. Published: Nov. 2017.*
JP-2007091968 Eng Tran. Published. Apr. 2007.*
Polyquaternium 55. https://web.archive.org/web/20141004220934/http://www.saapedia.org/en/saa/?type=detail&id=3771#google_vignette. Published: Oct. 4, 2014.*
Referenced cited in the international search report of PCT Application No. PCT/US2018/59791 published on May 16, 2019 under publication No. WO2019/094568.
Ashland. 'PVPNA Polymers Chemistry: PVP Polymers and VP Derivatives'; Publication 23/21-22, 31, 32/31, [online]. Jan. 2017 [retrieved May 20, 2019). Retrieved from the Internet: <URL:33/32/31 https://www.ashland.com/industries/personal-and-home-care/hair-care/pvp-va-polymers-and-copolymers>; p. 1; p. 1, first paragraph.
Cationic Polymera and Fixative Applications Thereof ED-Darl Kuhn, ip.com, IP.COM.Inc., West Henrietta, NY, US, May 7, 2009, XP013131638, ISSN:1533-0001.

* cited by examiner

Polyquaternium-4     Cationic galactomannan

HAIR STYLING COMPOSITIONS COMPRISING POLYGALACTOMANANS, AND METHOD FOR USING THE SAME

CROSS-REFERENCE TO RELATED APPLICATIONS

This application is a U.S. National Phase filing under 35 U.S.C. § 371 of International Application No. PCT/US2019/025101, filed Apr. 1, 2019, and published as WO2019191747 on Oct. 3, 2019, which claims benefit of priority U.S. Provisional Patent Application No. 62/650,747, filed Mar. 30, 2018. The entire contents of each of the prior applications are incorporated herein by reference in their entirety.

FIELD OF THE INVENTION

The present application provides a hairstyling composition, and more particularly, but not by way of limitation, a hair styling composition comprising a cationically modified polygalactomannan having a molecular weight in a range of from about 40 to about 1100 KDa.

BACKGROUND OF THE INVENTION

Galactomannan polymers (also called polygalactomannans) are generally obtained from the endosperm of seeds of leguminous plants such as *Cyamopsis tetragonoloba* (guar gum, mannose:galactose ~2:1), *Trigonella foenum-graecum* (fenugreek gum, mannose:galactose ~1:1), *Cesalpinia spinosa* (tara gum, mannose:galactose ~3:1), *Ceratonia siliqua* (locust bean gum or carob gum, mannose:galactose ~4:1), and *Cassia tora* and *Cassia obtusifolia* (cassia gum, mannose:galactose at least ~5:1). The polygalactomannans have different properties depending on the origins. For example, the polygalactomannan contained in guar gum (average mannose to galactose ratio 2:1) is mostly soluble in water at ambient temperature, while the polygalactomannan obtained from cassia gum (average mannose to galactose ratio 5:1) is only sparingly soluble in water at ambient temperature and very slightly soluble at elevated temperature.

Galactomannan polymers are typically used in personal care, health care, household care, and industrial care compositions and the like. Such galactomannan polymers are also useful as deposition aids, stabilizers, emulsifiers, spreading aids and carriers for enhancing the efficacy, and deposition and delivery of chemically and physiologically active ingredients. In addition, such polymers are useful as active components in personal care compositions such as film formers, hair fixatives, hair conditioners, deposition aids, and skin conditioners. These polymers are also useful for improving the psychosensory and aesthetic properties of personal care formulations. In particular, cationically modified polygalactomannans have been widely used in many personal care applications, e.g. shampoos, shower gels, hair thickening compositions, skin creams and lotions, where they provide rheological properties to the compositions and desirable properties to the hair and skin.

U.S. Pat. No. 9,782,609 assigned to Hercules discloses a dihydroxyalkyl substituted polygalactomannan and the optional substitution of such with cationic and/or hydrophobic moieties used in industrial applications, fabric laundering, and personal and household cares.

U.S. Pat. No. 7,262,157 assigned to Utz et al. discloses a personal care composition comprising a Cassia galactomannan polymer having repeating units containing a D-mannosyl to D-galactosyl residue ratio of 5 to 1.

PCT application No. 2012170171 assigned to Lubrizol discloses a hair fixative composition comprising cationically and amphiphilically modified Cassia galactomannan polymers having an average mannose to galactose ratio of at least 5:1.

PCT application No. 2015095677 assigned to Rohm and Haas discloses a personal care composition comprising a guar derivative, wherein the guar derivative is chemically modified through an ethoxyl, propoxyl, or hydroxypropoxyl linking group with a tertiary cyclic amine compound.

In view of the foregoing, there is an increasing demand for hair care products utilizing cationically modified galactomannans. Despite the well-known utility of cationically modified galactomannans as conditioning polymers or thickening agents in treatment delivery to the hair and skin, there is a need to provide cationically modified galactomannan compositions with a specific molecular weight range that exhibit significant water solubility and potentially improved viscosity and ability to spread through hair without being too heavy and which persistently impart significantly better sensory performance in hair styling applications. Such galactomannan compositions will have widespread utility in applications such as delivery of enhanced curl formation and maintenance, and improved high humidity hold in styling applications with additional improvements in foam bloom and stabilization in aerosol mousse formulation.

SUMMARY OF THE INVENTION

The present application discloses a hair styling composition comprising: (i) at least one cationically modified polygalactomannan having a molecular weight in a range of from about 40 to about 1100 KDa and at least one cosmetic ingredient.

One aspect of the present application provides a hair styling composition for a keratin substrate, and wherein, the composition comprises cationically modified polygalactomannan having a molecular weight in a range of from about 150 to about 700 KDa, wherein the cationic degree of substitution (Cat-DS) is of greater than 0.001 units.

Another aspect of the present application discloses a hair gel, mousse or aerosol spray-based hair styling composition comprising at least one cationically modified polygalactomannan having a molecular weight in a range of from about 40 to about 1100 KDa, and at least one cosmetic ingredient.

Another aspect of the present application discloses a hair styling composition for use in increasing foam enhancement, stiffness, humidity resistance, durability of hold, low slip, and curl maintenance comprising: cationically modified polygalactomannan having a molecular weight in a range of from about 150 to about 700 KDa, wherein the cationic degree of substitution (Cat-DS) is of greater than 0.001 units.

One another aspect of the present application discloses an aerosol hair styling mousse composition comprising: (i) about 0.1 wt. % to about 2 wt. % of guar hydroxypropyltrimonium chloride having a weight average molecular weight in a range of from about 40 to about 1100 KDa; and (ii) about 0.1 wt. % to about 25 wt. % of at least one cosmetic ingredient.

Yet another aspect of the present application discloses a hairstyling composition for use in increasing foam enhancement, stiffness, humidity resistance, durability of hold, low slip, and curl maintenance comprising: (i) at least one cationically modified polygalactomannan having a molecular weight in a range of from about 40 to about 1100 KDa; (ii) at least one quaternary ammonium compound; (iii) at least one copolymer of vinyl pyrrolidone or polyvinyl pyrrolidone (PVP) or maleic anhydride or polyimide; and (iv) at least one cosmetic ingredient.

Yet another aspect of the present invention discloses a hair styling gel composition comprising: (i) about 0.1 wt. % to about 2 wt. % of guar hydroxypropyltrimonium chloride having a weight average molecular weight in a range of from about 40 to about 1100 KDa; (ii) about 0.1 wt. % to about 10 wt. % of polyvinylpyrrolidone/vinyl acetate copolymer, vinyl pyrrolidone/2-(dimethylamino)ethyl methacrylate copolymer, ethyl ester of methyl vinyl ether/maleic anhydride copolymer or polyimide-1 and (iii) about 0.1 wt. % to about 25 wt. % of at least one cosmetic ingredient consisting of preservatives, $\alpha$-hydroxycarboxylic acids and mixture thereof, wherein, the preservative comprises phenoxy ethanol, capryloyl glycol or mixtures thereof, and the $\alpha$-hydroxycarboxylic acid is selected from group consisting of lactic acid, citric acid and malic acid.

Still another aspect of the present application provides a method for straightening or styling hair comprising steps of: (a) washing hair with shampoo; (b) eliminating or reducing the moisture of the hair of the step (a) to obtain a dried or damp hair; (c) treating the hair by applying the aforementioned hair styling composition to the dried or damp hair of the step (b); (d) leaving the treated hair for about 15 to about 30 minutes; (e) hot air drying the treated hair of the step (d) by mechanically styling, curling or straightening; (f) ironing the hair of the step (e) for about 4-8 times using a flat iron preheated to about 375-450° F.; and (g) allowing the hair of the step (f) to remain for about 15 to about 20 minutes to obtain the straightened or styled hair.

BRIEF DESCRIPTION OF THE FIGURES

Further embodiments of the present application can be understood with the appended figures.

DETAILED DESCRIPTION OF THE INVENTION

Figure 1:
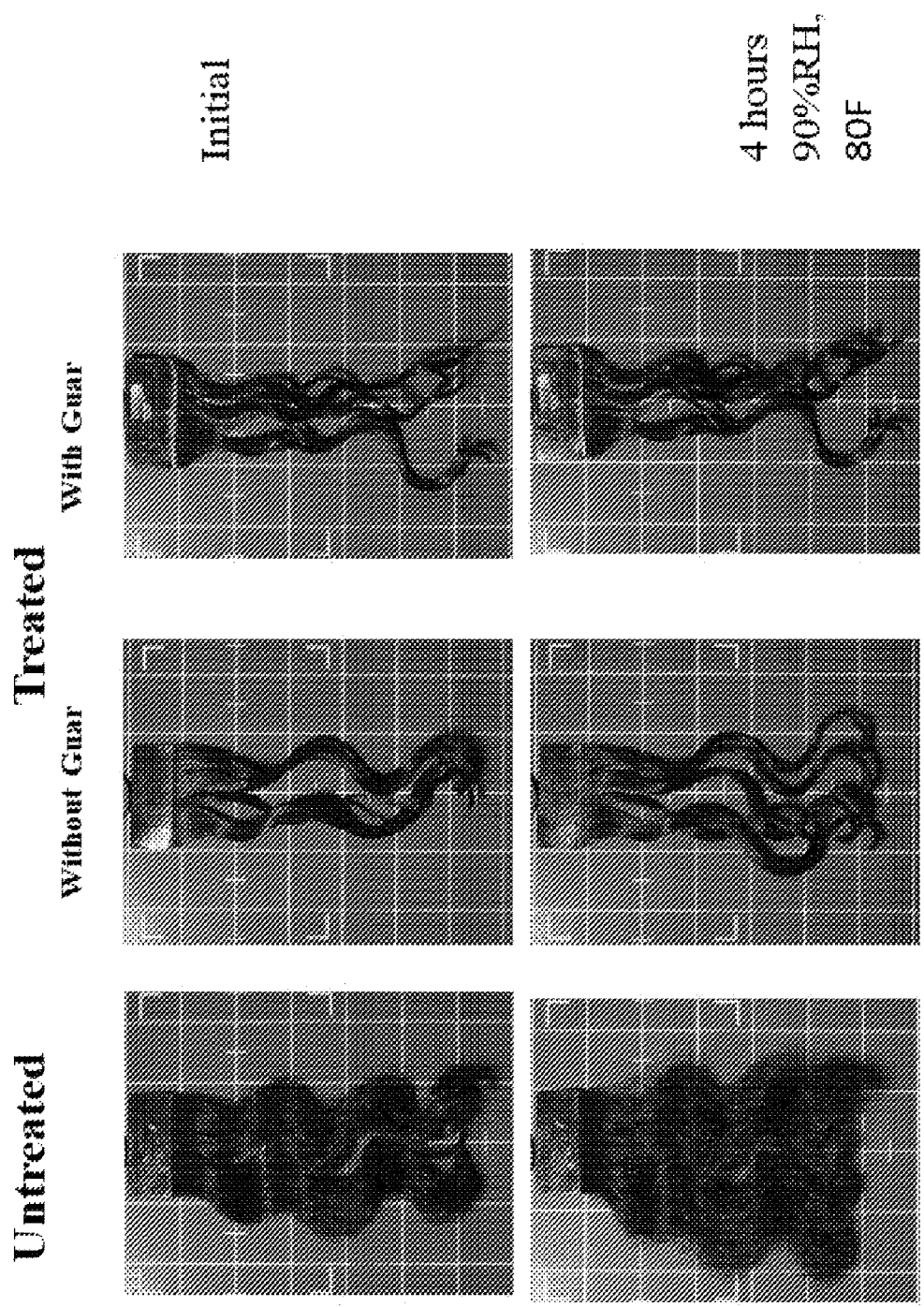
FIG. 1 shows enhanced curl formation and maintenance of hair treated with cationically modified guar.

Before explaining at least one aspect of the disclosed and/or claimed inventive concept(s) in detail, it is to be understood that the disclosed and/or claimed inventive concept(s) is not limited in its application to the details of construction and the arrangement of the components or steps or methodologies set forth in the following description or illustrated in the drawings. The disclosed and/or claimed inventive concept(s) is capable of other aspects or of being practiced or carried out in various ways. Also, it is to be understood that the phraseology and terminology employed herein is for the purpose of description and should not be regarded as limiting.

As utilized in accordance with the disclosure, the following terms, unless otherwise indicated, shall be understood to have the following meanings.

Unless otherwise defined herein, technical terms used in connection with the disclosed and/or claimed inventive concept(s) shall have the meanings that are commonly understood by those of ordinary skill in the art. Further, unless otherwise required by context, singular terms shall include pluralities and plural terms shall include the singular.

The singular forms "a," "an," and "the" include plural forms unless the context clearly dictates otherwise specified or clearly implied to the contrary by the context in which the reference is made. The term "Comprising" and "Comprises of" includes the more restrictive claims such as "Consisting essentially of" and "Consisting of".

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

All percentages, parts, proportions and ratios as used herein, are by weight of the total composition, unless otherwise specified. All such weights as they pertain to listed ingredients are based on the active level and, therefore; do not include solvents or by-products that may be included in commercially available materials, unless otherwise specified.

All publications, articles, papers, patents, patent publications, and other references cited herein are hereby incorporated herein in their entirety for all purposes to the extent consistent with the disclosure herein.

The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limit may also produce satisfactory results.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "each independently selected from the group consisting of" means when a group appears more than once in a structure, that group may be selected independently each time it appears.

The term "polymer" refers to a compound comprising repeating structural units (monomers) connected by covalent chemical bonds. Polymers may be further derivatized, crosslinked, grafted or end-capped. Non-limiting examples of polymers include copolymers, terpolymers, tetrapolymers, quaternary polymers, and homologues. The term "copolymer" refers to a polymer consisting essentially of two or more different types of monomers polymerized to obtain said copolymer.

The phrase "cosmetic ingredient" or "cosmetically acceptable ingredient" refers to molecular entities and compositions that are generally regarded as safe. Particularly, as used herein, the term "cosmetic ingredient" means approved by a regulatory agency of the appropriate governmental agency or listed in the U.S. Pharmacopoeia or other generally recognized pharmacopoeia for use in animals, and more particularly in humans.

The term "keratin substrate" or "keratinous substrate" as used herein includes skin, nails and "keratin fibers", and wherein the "keratin fibers" means hair on head, eyelashes, eyebrows and other mammalian bodily hair.

The term "hair styling composition" refers to any composition intended for use on the human body for protection from harmful or undesirable radiation from the sun.

What is described herein is a hair styling composition comprising at least one cationically modified polygalactomannan having a weight average molecular weight in a range of from about 40 to about 1100 KDa and at least one cosmetic ingredient.

One embodiment of the present application discloses to employ cationically modified galactomannan, wherein the term "modified galactomannan" in the present application encompasses the terms of modified galactomannan polymer, cationically modified galactomannan and cationically hydrophobically modified galactomannan. Further the term "modified", as used herein to include galactomannan alkyl, alkenyl, alkynyl, aryl, arylalkyl or arylalkenyl ethers, esters, urethanes, amides, or carbonates; or galactomannans having any other linkage to the galactomannan backbone. The modified galactomannans can have additional substituents which can be cationic, and optionally comprises anionic or nonionic based functionalities. Examples of the cationic substituents include quaternary ammonium and phosphonium groups. Examples of the anionic substituents include carboxyl, phosphate, sulfate, carboxyalkyl, sulfoalkyl, and phosphoalkyl. Examples of the nonionic substituents include alkyl, aryl, and hydroxyalkyl. Polygalactomannans am known in the art and are polymers comprising, as polymerized units, galactose and mannose. Polygalactomannans differ from each other, inter alia, in the ratio of galactose units to mannose units. The galactose:mannose ratio is determined, in part, by the source of the galactomannan. Polygalactomannans can be obtained from several sources, including guar, tara, fenugreek, and locust bean gum. For the present application, cationically modified polygalactomannans derived from guar gum, such as alkyl guar, and especially ethyl guar, are particularly useful. However, other cationically modified polygalactomannans can also be advantageously used in the compositions and methods of the present application. In another embodiment, the cationic galactomannan gum can be selected from the group consisting of cationic guar gum, cationic locust bean and cationic fenugreek gums.

In one embodiment, a weight average molecular weight of the cationically modified polygalactomannan of the present application is determined by gel permeation chromatography (GPC), and can be varied from about 40 to about 110 KDa, or from about 250 to about 70 KDa, or from about 150 to about 700 KDa.

The cationically modified polygalactomannan used in the present application has a cationic degree of substitution (Cat-DS) of greater than 0.001 units. In one non-limiting embodiment, the cationically modified polygalactomannan is provided with a cationic degree of substitution of from about 0.001 to about 5.0. Further, the cationically modified polygalactomannan of the present application has a cationic charge density in a range of from about 1 meq/g to about 8 meq/g, or from about 3.5 meq/g to about 7 meq/g, or from about 0.001 meq/g to about 0.7 meq/g.

The hair styling composition can further comprise at least one quaternary ammonium compound. The suitable quaternary ammonium compounds for the present application can include, but are not limited to, Polyquaternium 1, Polyquaternium 2, Polyquaternium-4, Polyquaternium 5, Polyquaternium 6, Polyquaternium 7, Polyquaternium 8, Polyquaternium 9, Polyquaternium 10, Polyquaternium 1, Polyquaternium 12, Polyquaternium 13, Polyquaternium 14, Polyquaternium 15, Polyquaternium 16, Polyquaternium 17, Polyquaternium 18, Polyquaternium 19, Polyquaternium 20, Polyquaternium 22, Polyquaternium 24, Polyquaternium 27, Polyquaternium 28, Polyquaternium 29, Polyquaternium 30, Polyquaternium 31, Polyquaternium 32, Polyquaternium 33, Polyquaternium 34. Polyquaternium 35 and Polyquaternium 36, Polyquaternium-37, Polyquaternium 39, Polyquaternium 42, Polyquaternium 43, Polyquaternium 44, Polyquaternium 45, Polyquaternium 46, Polyquaternium 47, Polyquaternium 48, Polyquaternium-49, Polyquaternium 50, Polyquaternium 51, Polyquaternium 52, Polyquaternium 53, Polyquaternium 54, Polyquaternium 55, Polyquaternium 56, Polyquaternium 57. Polyquaternium 58, Polyquaternium 59, Polyquaternium 60, Polyquaternium 61, Polyquaternium 62, Polyquaternium 63, Polyquaternium 64, Polyquaternium 65, Polyquaternium 66, Polyquaternium 67, Polyquaternium 68, Polyquaternium 69, Polyquaternium-70, Polyquaternium 71, Polyquaternium 72, Polyquaternium 73, Polyquaternium 74, Polyquaternium 75, Polyquaternium 76, Polyquaternium 77, Polyquaternium 78, Polyquaternium-79, Polyquaternium 80, Polyquaternium 81, Polyquaternium 82, Polyquaternium 83, Polyquaternium 84, Polyquaternium 85, Polyquaternium 86 and Polyquaternium 87 or Pseudoquarternium compounds. In one non-limiting embodiment, the quaternary ammonium compound is Polyquaternium-11 or Polyquaternium-55. Wherein, the use ranges for preparing the hair styling composition can include from about 0.001 to about 10% by weight, or from about 2.5 to about 10% by weight, based on the total weight of the hair styling composition.

The hair styling composition can further comprise at least one of a copolymer of polyvinyl pyrrolidone (PVP); a copolymer of vinylpyrrolidone; a copolymer of maleic anhydride; and polyimide-1.

Suitable copolymers and polymers for preparing the hair styling composition of the present application can include, but are not limited to, vinyl pyrrolidone (VP)/dimethylaminoethyl methacrylates copolymer (DMAEMA), vinyl acetate (VA)/crotonates copolymer, polyvinylpyrrolidone (PVP)/vinyl acetate (VA) copolymer, PVP/acrylates copolymer, vinyl pyrrolidone (VP)/dimethylaminopropylamine (DMAPA) acrylates copolymer, vinyl caprolactam/dimethylaminoethyl methacrylates copolymer, vinyl caprolactam/vinylpyrrolidone copolymer, copolymers of monoalkyl esters of poly (methyl vinyl ether/maleic acid), polyvinylcaprolactam, polyurethanes, and polyimides.

Another embodiment discloses to employ polyvinylpyrrolidone (PVP)/vinyl acetate (VA) copolymer, vinyl pyrrolidone (VP)/2-(dimethylamino) ethyl methacrylate copolymer, ethyl ester of methyl vinyl ether (MVE)/maleic anhydride (MA) copolymer, or polyimide-1. Wherein, the use ranges of the copolymers and polymers for preparing the hair styling composition can be varied from about 0.001 to about 10% by weight, or from about 2.5 to about 10% by weight, based on the total weight of the hairstyling composition.

The present application discloses to employ at least one cosmetic ingredient selected from the group consisting of preservatives, antioxidants, chelating agents, sunscreen agents, proteins, amino acids, vitamins, dyes, hair coloring agents, plant extracts, plant derivatives, plant tissue extracts, plant seed extracts, plant oils, botanicals, botanical extracts, humectants, fragrances, perfumes, oils, emollients, lubricants, butters, penetrants, viscosity modifiers, thickeners, hair fixatives, film formers, surfactants, detergents, emulsifiers, opacifying agents, volatiles, propellants, liquid vehicles, carriers, salts, pH adjusting agents, neutralizing agents, buffers, hair conditioning agents, anti-static agents, anti-frizz agents, anti-dandruff agents, hair waving agents, hair straightening agents, relaxers, absorbents, fatty substances, gelling agents, moisturizers, hydrophilic or lipophilic active agents, fillers, reducing agents, cosmetic oils, solvents, silicones, and combinations thereof.

Examples of suitable preservatives for incorporating into the hair styling composition of the present application can be non-polymeric preservatives for preventing microbial contamination and/or oxidation. Typical preservatives can include, but are not limited to, phenoxyethanol, paraben, caprylyl glycol, iodopropynyl butyl carbamate, diazolidinyl urea and/or propylene glycol, alpha-tocopherol acetate, ascorbic acid, butylated hydroxytoluene, butylated hydroxyanisole, methylparaben, ethylparaben, n-propylparaben, dehydroacetic acid and mixtures thereof. The suitable range of the preservatives employed in the present application can be varied from about 0.01 wt. % to about 2 wt. %, or from about 0.01 wt. % to about 0.1 wt. %, or from about 0.1 wt. % to about 1.0 wt. %, or from about 1.0 wt. % to about 2.0 wt. % based on the total weight of the composition.

Another embodiment employs α-hydroxycarboxylic acids for preparing the hair styling composition of the present application, and wherein, the acids are selected from the group consisting of lactic acid, citric acid or malic acid, mandelic acid, glycolic acid, tartronic acid, tartaric acid, aconitic acid, tricarballylic acid, malonic acid, and gluconic acid. The amount of the α-hydroxycarboxylic acid(s) can be varied in a range of from about 0.001 wt. % to about 2 wt. %. Other ranges of acids to be employed in the present application can be from about 0.001 wt. to about 0.1 wt. %, or from about 0.01 wt. % to about 0.1 wt. %; or from about 0.1 wt. % to about 1.0 wt. %, or from about 1.0 wt. % to about 2.0 wt. % based on the total weight of the composition.

In one non-limiting embodiment, the surfactants are cationic surfactants. Examples of the cationic surfactants used for preparing the hair styling composition of the present application can include, but are not limited to, cetrimonium chloride, behentrimonium chloride and stearamidopropyl dimethylamine. Suitable range of the cationic surfactants present in the hair styling compositions are from about 0.001 wt. to about 0.01 wt. %, or from about 0.01 wt. % to about 0.1 wt. %, or from about 0.1 wt. % to about 0.5 wt. %, or from about 0.5 wt. % to about 1.0 wt. % based on the total weight of the composition. It is contemplated to employ other suitable surfactants for the present application, which can be selected from an anionic surfactant, an amphoteric surfactant, a nonionic surfactant, and combinations thereof.

According to the presently disclosed and/or claimed inventive concept(s), the solvent used in the hair styling composition should be compatible with the other components of the disclosed compositions. Examples of the solvents that can be used are water, water-lower alkanols mixtures, and polyhydric alcohols having from 3 to 6 carbon atoms and from 2 to 6 hydroxyl groups. Other suitable solvents are water, propylene glycol, water-glycerin, sorbitol-water, and water-ethanol. The solvent, when used, is present in the composition at a level of from about 0.1% to about 99% by weight based on the total weight of the composition.

According to the presently disclosed and/or claimed inventive concept(s), the propellant is a mixed propellant system of hydrocarbons, which can be a dimethyl ether or C3-C5 alkanes, especially one selected from the group consisting of propane, isobutane, n-butane and mixtures thereof. In one non-limiting embodiment, a combination of propane and isobutane is used such as a commercially available product as A46 (Aeropress Corporation). Suitable ranges of the propellant can be varied from about 0.5 to about 10%, or from about 1.5 to about 8%, or from about 6 to about 7.5% by weight based on the total weight of the composition.

It is disclosed that the hair styling compositions of the present application can be used for the following non-liming functions: fixing or treating hair and features conditioning and/or styling properties such as detangling, wet combability, wet feel, dry combability, dry feel, sheen, static flyaway control, hydrophobicity, surface smoothening, improved deposition, no build-up, color protection, and/or curl retention.

The hair styling compositions of the present application can be used for the following non-liming types of hair selected from the group consisting of Caucasian, European, Asian and African origins having fine, medium and coarse virgin, damaged, colored, grey or bleached hairs and textures comprising wavy, curly, coily or kinky patterns.

The hair styling compositions of the present application can be formulated in an appropriate product form including but not limited to shampoos, hair conditioners, 2 in 1 shampoos, leave in and rinse off conditioners, hair treatments including intensive treatments, styling and treating hair compositions, hair perming products, hair straighteners, hair relaxants, hair sprays and lacquers, permanent hair dyeing systems, hair styling mousses, hair gels, semi-permanent hair dyeing systems, temporary hair dyeing systems, hair bleaching agents, permanent hair wave systems, hair setting formulations, non-coloring hair preparations, hair-frizz-control gels, hair leave-in conditioners, hair pomades, hair de-tangling products, hair fixatives, hair conditioning mists, hair care pump sprays and other non-aerosol sprays, hair cuticle coats, and wherein, the pH of the above hair styling compositions is in a range of from about 3 to about 13, or from about 5 to about 8.

The hair styling composition of the present application can be formulated in various deliverable forms, which can include emulsion, lotion, gel, vesicle dispersion, paste, cream, solid stick, mousse, shampoo, spray, balm, wipe, milk, foam, jellies, liquid, tonics, and/or enamel.

According to one embodiment of the present application, the hairstyling composition of the present application can provide a hair style that has (1) enhanced curl formation and maintenance, (2) improved high humidity hold, and (3) improvement in foam bloom and stabilization.

In one non-limiting embodiment, the amount of the composition used for hair styling or hair straightening purpose is in a range of from about 0.01 wt. % to about 10.0 wt. %, or from about 0.01 wt. % to about 0.1 wt. %, or from about 0.1 wt. % to about 1.0 wt. %, or from about 1.0 wt. % to about 5.0 wt. %, or from about 5.0 wt. % to about 10.0 wt. %.

According to one embodiment of the present application, There is provided a method for hair styling or hair straightening comprising the steps of: (a) washing hair with shampoo; (b) eliminating or reducing the moisture of the hair of the step (a) to form a dried or damp hair, (c) treating the hair by applying the hair styling composition aforementioned to the dried or damp hair of the step (b); (d) leaving the treated hair for about 15 to about 30 minutes; (e) hot air drying the treated hair of the step (d) by mechanically styling, curling or straightening; (f) ironing the hair of the step (e) for about 4-8 times using a flat iron preheated to about 375-450° F.; and (g) allowing the hair of the step (f) to remain for about 15 to about 20 minutes to obtain the straightened or styled hair.

A hairstyling composition of the present application can also comprise about 0.1 wt. % to about 2 wt. % of cassia gum and/or guar hydroxypropyltrimonium chloride having a molecular weight in a range of from about 40 to about 1100 KDa; about 0.1 wt. % to about 10 wt. % of Polyquaternium-55 (PQ-55) or Polyquaternium-11 (PQ-11); about 0.1 wt. % to about 10 wt. % of polyvinylpyrrolidone (PVP)/vinyl acetate (VA) copolymer or vinyl pyrrolidone (VP)/2-(dimethylamino)ethyl methacrylate copolymer or ethyl ester of methyl vinyl ether/maleic anhydride copolymer or polyimide-1; and about 0.1 wt. % to about 25 wt. % of at least one or more cosmetic ingredient(s).

Another embodiment discloses an aerosol hair styling mousse composition comprising: (i) about 0.1 wt. % to about 2 wt. % of guar hydroxypropyltrimonium chloride having a molecular weight in the range of from about 40 to about 1100 KDa; (ii) about 0.1 wt. % to about 10 wt. % of Polyquaternium-55 (PQ-55) or Polyquaternium-1 (PQ-11); (iii) about 0.1 wt. % to about 10 wt. % of polyvinylpyrrolidone/vinyl acetate copolymer or vinyl pyrrolidone/2-(dimethylamino)ethyl methacrylate copolymer or ethyl ester of methyl vinyl ether/maleic anhydride copolymer or polyimide-1; and (iv) about 0.1 wt. % to about 25 wt. % of at least one cosmetic ingredient, and wherein the composition can exhibit a curl retention of about 80% to about 100% over a 24-hour period at 90% humidity and 80° F.

Another aspect of the present application discloses a hair styling composition for use in increasing foam enhancement and curl maintenance comprising: cationically modified polygalactomannan having a molecular weight in a range of from about 150 to about 700 KDa, wherein the cationic degree of substitution (Cat-DS) is of greater than 0.001 units.

Non-limiting embodiment of the present application provides a hair styling gel composition comprising: (i) about 0.1 wt. % to about 2 wt. % of guar hydroxypropytrimonium chloride having a weight average molecular weight in a range of from about 40 to about 1100 KDa; (ii) about 0.1 wt. % to about 10 wt. % of polyvinylpyrrolidone/vinyl acetate copolymer, vinyl pyrrolidone/2-(dimethylamino) ethyl methacrylate copolymer, ethyl ester of methyl vinyl ether/ maleic anhydride copolymer or polyimide-1 and (iii) about 0.1 wt. % to about 25 wt. % of at least one cosmetic ingredient consisting of preservatives, α-hydroxycarboxylic acids and mixture thereof, wherein, the preservative comprises phenoxy ethanol, caprylyl glycol or mixtures thereof, and the α-hydroxycarboxylic acid is selected from group consisting of lactic acid, citric acid and malic acid.

In a non-limiting embodiment, the hair styling gel composition exhibits a curl retention of about 80% to about 100% over a 24-hour period at 90% humidity and 80° F.

The hair styling composition for use in increasing humidity resistance, stiffness, durability of hold, low slip, foam enhancement and curl maintenance comprises: (i) at least one cationically modified polygalactomannan having a molecular weight in the range of from about 40 to about 1100 KDa; (ii) at least one quaternary ammonium compound; (iii) at least one copolymer of vinyl pyrrolidone, copolymer of polyvinyl pyrrolidone (PVP), copolymer maleic anhydride and polyimide; and (iv) at least one cosmetic ingredient.

The following examples are presented for purposes of demonstrating, but not limiting, the preparation and use of the polymers. In the examples, the following abbreviations are used:

VP: Vinylpyrrolidone
PVP: Polyvinylpyrrolidone
VA: Vinyl acetate
DMAEMA: 2-(dimethylamino)ethyl methacrylate
PQ-55: Polyquaternium-55
PQ-11: Polyquaternium-11 (Copolymer of vinylpyrrolidone and quaternized dimethylminoethyl methacrylate)

Further, certain aspects of the present application are illustrated in detail by way of the following examples. The examples are given herein for illustration of the application and are not intended to be limiting thereof.

EXAMPLES

Example 1: Hair Styling Compositions: Traditional Aerosol Mousse

| Ingredients | With Guar wt % | Without Guar wt % |
|---|---|---|
| Concentrate | | |
| Deionized Water | 87.49 | 85.56 |
| Polyquaternium-11 | 2.50 | 4.15 |
| PVP/VA Copolymer | 2.00 | 3.34 |
| Cetrimonium Chloride | 0.20 | 0.20 |
| Guar Hydroxypropyltrimonium Chloride | 1.00 | — |
| Phenoxy ethanol and Caprylyl Glycol | 0.75 | 0.75 |
| Lactic Acid | 0.06 | |
| Propellant | | |
| Isobutane/propane | 6.00 | 6.00 |
| Total | 100 | 100 |

Example 2: Hair Styling Composition: Spray Mousse

| Ingredients (Trade name | INCI) | wt % |
|---|---|
| Phase A | |
| deionized water | 20.00 |
| ethyl ester of PV/MA copolymer | 5.00 |
| aminomethyl propanol | 0.46 |
| Phase B | |
| deionized water | 58.86 |
| guar hydroxypropyltrimonium chloride | 0.50 |
| lactic Acid | 0.05 |

-continued

| Ingredients (Trade name | INCI) | wt % |
|---|---|
| Additional Ingredients | |
| polyimide-1 | 3.33 |
| oleth 20 | 0.40 |
| dicetyldimonium chloride | 0.15 |
| amodimethicone/centrimonium chloride/trideceth-10 | 0.50 |
| glycerin/glyceryl acrylate/acrylic acid copolymer | 0.25 |
| phenoxyethanol/caprylyl glycol | 0.50 |
| Propellant | |
| dimethyl ether | 6.67 |
| propane/isobutane | 3.33 |
| Total | 100.00% |

Example 3: Curl Spray (Non-Aerosol)

| Ingredients | wt % |
|---|---|
| Deionized Water | 88.82 |
| Ethanol | 6.00 |
| Polyimide-1 | 3.33 |
| Guar hydroxypropyltrimonium chloride | 0.50 |
| Lactic Acid | 0.100 |
| Cetrimonium Chloride | 0.25 |
| Glycerin | 0.25 |
| Optiphen | 0.75 |
| Total | 100.00 |
| pH | 5.00 |

Example 4: Styling Spray—Non-Ethanol Aerosol

| Ingredients | wt % |
|---|---|
| Water | 54.25 |
| Tetrasodium EDTA | 0.1 |
| Carbomer | |
| Acrylic Acid/Vinyl Pyrrolidone Crosspolymer | 0.85 |
| NaOH (10% soln') | 0.85 |
| Water | 9.27 |
| Polyquaternium-69 | 3.33 |
| NaOH (10% soh') | 0.85 |
| Guar hydroxypropyltrimonium chloride | 0.5 |
| Lactic Acid | qs |
| Dimethyl ether | 30 |
| Total | 100 |

Example 5: Hair Styling Compositions with Various Molecular Weights of Cationically Modified Polygalactomannans

| Ingredients | ~Mw (kDa) | wt % | wt % | wt % | wt % | wt % | wt % | wt % |
|---|---|---|---|---|---|---|---|---|
| Water | | 83.97 | 92.97 | 92.97 | 92.97 | 92.97 | 92.97 | 92.97 |
| Guar Hydroxypropyltrimonium Chloride | 50 | 10.00 | — | — | — | — | — | — |
| Guar Hydroxypropyltrimonium Chloride | 300 | — | 1.00 | — | — | — | — | — |
| Guar Hydroxypropyltrimonium Chloride | 1000 | — | — | 1.00 | — | — | — | — |
| Guar Hydroxypropyltrimonium Chloride | 800 | — | — | — | 1.00 | — | — | — |
| Cassia Hydroxypropyltrimonium Chloride | 600 | — | — | — | — | — | 1.00 | — |
| Lactic acid | — | 0.03 | 0.03 | 0.03 | 0.03 | 0.03 | 0.03 | 0.03 |
| Isobutane/propane | — | 6.00 | 6.00 | 6.00 | 6.00 | 6.00 | 6.00 | 6.00 |
| Total | — | 100.00 | 100.00 | 100.00 | 100.00 | 100.00 | 100.00 | 100.00 |
| % solids | | 1.00 | 1.00 | 1.00 | 1.00 | 1.00 | 1.00 | 1.00 |

Example 6: Hair Styling Compositions—Guar Hydroxypropyltrimonium Chloride

| Ingredients | wt % | wt % | wt % | wt % |
|---|---|---|---|---|
| Water | 92.07 | 92.02 | 92.07 | 91.72 |
| Guar Hydroxypropyltrimonium Chloride | 1.00 | 1.00 | 1.00 | 1.00 |
| Cetrimonium chloride (30% in water) | 0.15 | — | — | 0.15 |
| OLETH-20 | — | 0.20 | — | 0.20 |
| PPG-2 hydroxyethyl cocamide | — | — | 0.15 | 0.15 |
| phenoxy ethanol and Caprylyl glycol | 0.75 | 0.75 | 0.75 | 0.75 |
| Lactic acid | 0.03 | 0.03 | 0.03 | 0.03 |
| Isobutane/propane | 6.00 | 6.00 | 6.00 | 6.00 |
| Total | 100.00 | 100.00 | 100.00 | 100.00 |

Example 7: Hair Styling Composition Comprising Guar Hydroxypropyltrimonium Chloride

| Ingredients | wt % |
| --- | --- |
| Deionized Water | 92.15 |
| Ethanol | 6.00 |
| Guar hydroxypropyltrimonium chloride | 0.50 |
| Lactic Acid | 0.10 |
| Cetrimonium Chloride | 0.25 |
| Glycerin | 0.25 |
| Optiphen | 0.75 |
| Total | 100.00 |

Example 8

Figure 4:
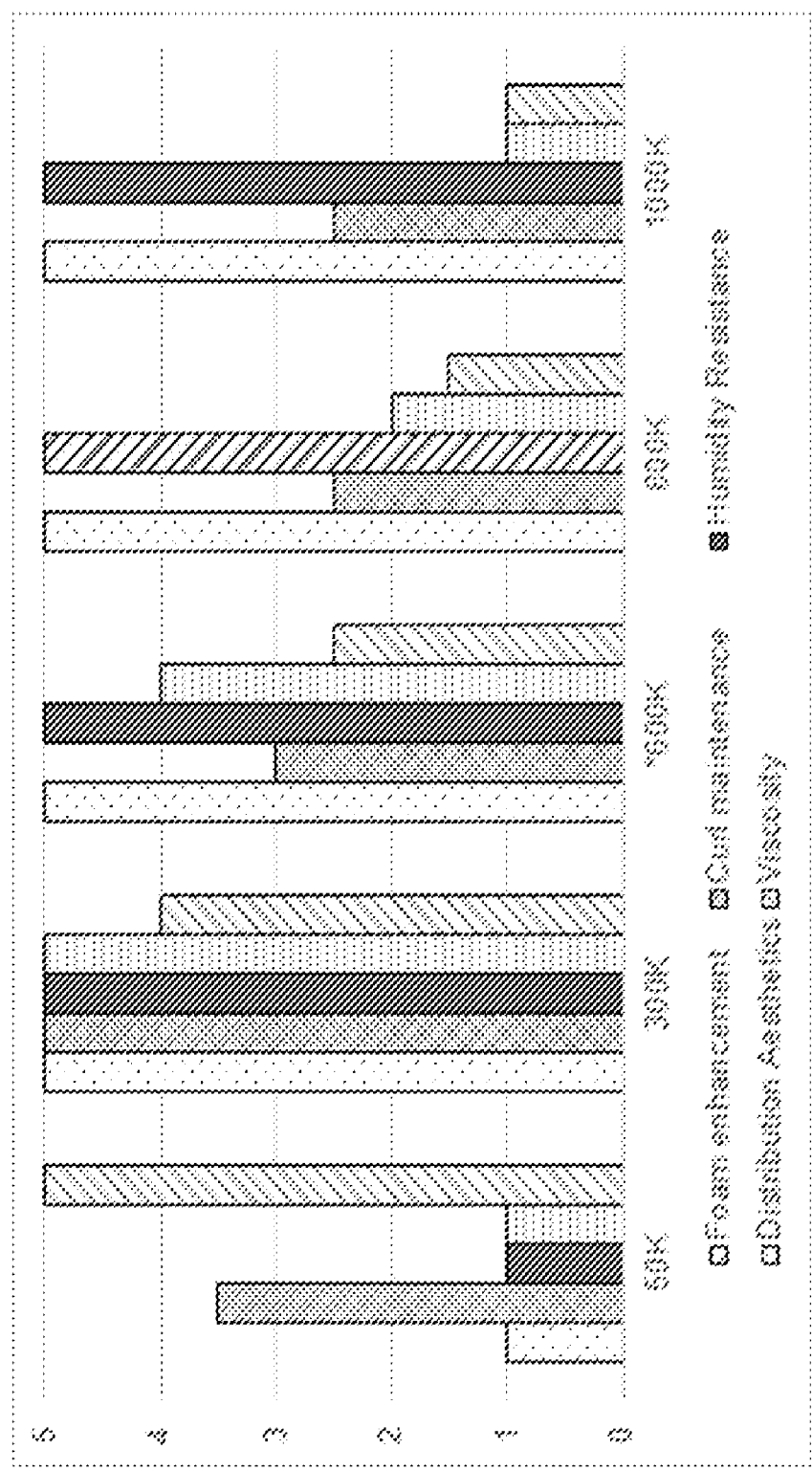
FIG. 4 shows foam enhancement, curl maintenance, viscosity, humidity resistance and distribution aesthetics performance of hair styling mousse composition comprising various molecular weights of cationically modified guar.

Experiments were performed to test foam enhancement, curl maintenance, viscosity, humidity resistance and distribution aesthetics performances of the compositions prepared in Example 5. The results are shown in FIG. 4. The test data indicates that the hair styling composition having cationically modified guar of 300K can provide significantly better results as compared to other molecular weight ranges.

Example 9: Enhanced Curl Formation and Maintenance 0.5 g mousse of Example 1 was applied to damp curly hair tress (International Hair Importers; Mulatto Type B, 3.5 g, 1.75" wide, 6.5" length) and scrunched to accentuate the curl, diffuse dried and evaluated for curl formation and 60 min exposure to high humidity for curl maintenance. Tress exposed to high humidity (90% RH, 27° C.) for 60 minutes and evaluated for curl maintenance (change in amplitude/frequency of the curl and frizz formation). FIG. 1 and Table 1 show the test results that indicate that the addition of Guar Hydroxypropyltrimonium Chloride delivers a more defined curl (as visually identified by a smaller wave frequency and higher amplitude) and maintained the curl at high humidity exposure.

TABLE 1

| Percentage of Curl retention | | | | | | | | | |
| --- | --- | --- | --- | --- | --- | --- | --- | --- | --- |
| t (minutes) | 0 | 30 | 60 | 90 | 120 | 180 | 300 | 420 | 1440 |
| With Guar | 100 | 100 | 100 | 98.72 | 98.72 | 94.87 | 92.92 | 92.92 | 91.64 |
| Std. dev | 0.0 | 0.0 | 0.0 | 3.14 | 3.14 | 8.31 | 10.71 | 10.71 | 12.49 |
| Without Guar | 100 | 99.36 | 88.15 | 48.87 | 26.41 | 18.05 | 16.77 | 16.77 | 15.49 |
| Std. dev | 1.57 | 18.27 | 31.44 | 10.05 | 1.84 | 1.92 | 1.92 | 2.45 | |

Figure 2:
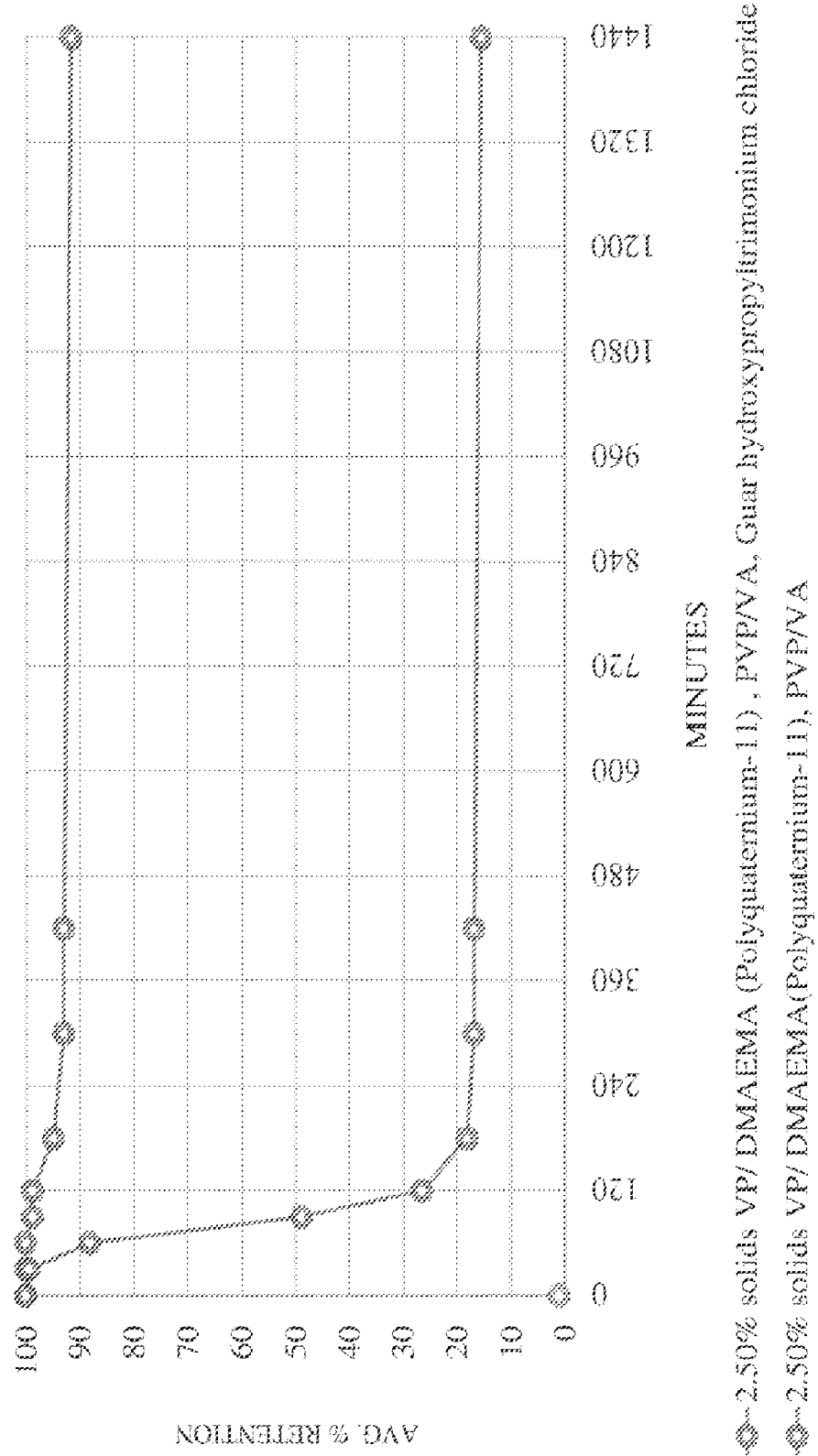
FIG. 2 shows improved high humidity hold of hair treated with VP/DMAEMA, PVP/VA, and guar hydroxypropyltrimonium chloride.

Example 10: High Humidity Hold; 24-Hour Evaluations 0.30 g mousse of Example 1 was applied to clean damp tress (International Hair Importers; Dark brown European, 2.0 g, 1.0" wide, 6.5" length) and rolled diagonally on 0.625" roller, dried under diffuse heat and equilibrated to 40 RH, 25° C. Roller was removed, and the tress was hung on horizontally lined board marked in 0.25" delineations and placed in high humidity environment (90RH, 27° C.). Initial reading for tress length was measured at the bottom of the curl. Additional readings were taken over 24 hrs and are shown in FIG. 2. Humidity resistance was calculated by the following equation:

$$(Lo-Lt/Lo-Li) \times 100 \text{ at time } t$$

Where: $Lo$=length of fully extended hair.
$Li$=length of hair before exposure (initial)
$Lt$=length of hair after exposure time (t)

Figure 3:
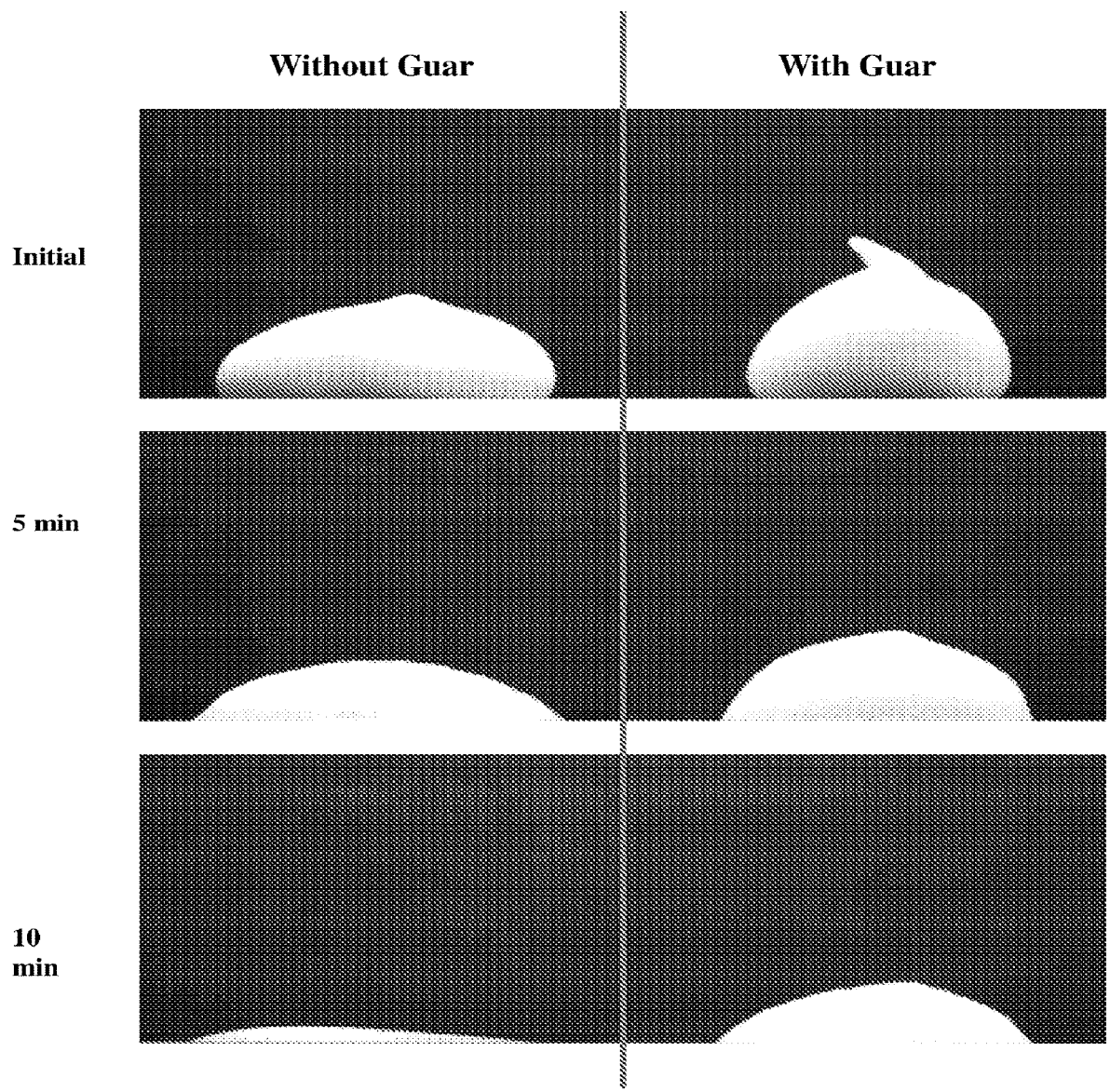
FIG. 3 shows improvements in foam bloom and stabilization of hair treated with cationically modified guar.

Example 11: Improvements in Foam Bloom and Stabilization 2.0 grams of aerosol mousse of Example 1 was dispensed side by side and observed over time. Qualitative evaluations were made from simple concentrate solution with the addition of propellant such as hydrocarbon, Water QS, Polymer 1-5%, Hydrocarbon 6-15%. Mousse valve: Precision Mousse valve, S90 inverted w/tailpiece 4 slot, Standard Stick Spout. The experimental results are shown in FIG. 3.

Example 12: Leave-on Combing Hair Cream with Guar Hydroxypropyltrimonium Chloride

| Ingredients | % w/w |
| --- | --- |
| PHASE A | |
| Aqua | 40.0 |
| Disodium EDTA | 0.05 |
| Cetyl Hydroxyethylcellulose | 0.05 |
| Guar Hydroxypropyltrimonium Chloride | 1.0 |
| Behentrimonium Methosulfate (80%) | 1.0 |
| PHASE B | |
| Cetearyl Alcohol (30/70) | 4.0 |
| PHASE C | |
| Aqua (Q.S.P) | 100.0 |
| PHASE D | |
| Propylene Glycol (and) Diazolidinyl Urea (and) Iodopropynyl Butylcarbamate | 0.5 |//
| PHASE E | |
| Citric Acid Soln 20% | 0.3 |

Example 13: Hair Styling Gel Compositions

| Ingredients | wt % | wt % | wt % | wt % |
|---|---|---|---|---|
| PHASE A | | | | |
| Water | 87.82 | 87.47 | 82.89 | 85.22 |
| Tetrasodium EDTA | 0.10 | 0.10 | 0.10 | 0.10 |
| Carbomer | 0.40 | 0.40 | 0.40 | 0.40 |
| Aminmethyl propanol | 0.18 | 0.18 | 0.18 | 0.18 |
| PHASE B | | | | |
| Wafer | 10.00 | 10.00 | 10.00 | 10.00 |
| Guar hydroxypropyltrimonium chloride | 0.50 | 0.50 | 0.50 | 0.50 |
| Lactic Acid | qs | qs | qs | qs |
| PHASE C | | | | |
| Oleth-20 | — | 0.35 | 0.35 | 0.35 |
| Gylcerin | — | — | 0.25 | 0.25 |
| Polyimide-1 | — | — | 3.33 | — |
| PVV/VA copolymer | — | — | 1.00 | 2.00 |
| phenoxy ethanol and caprylyl glycol | 1.00 | 1.00 | 1.00 | 1.00 |
| Total | 100.00 | 100.00 | 100.00 | 100.00 |

Figure 5:
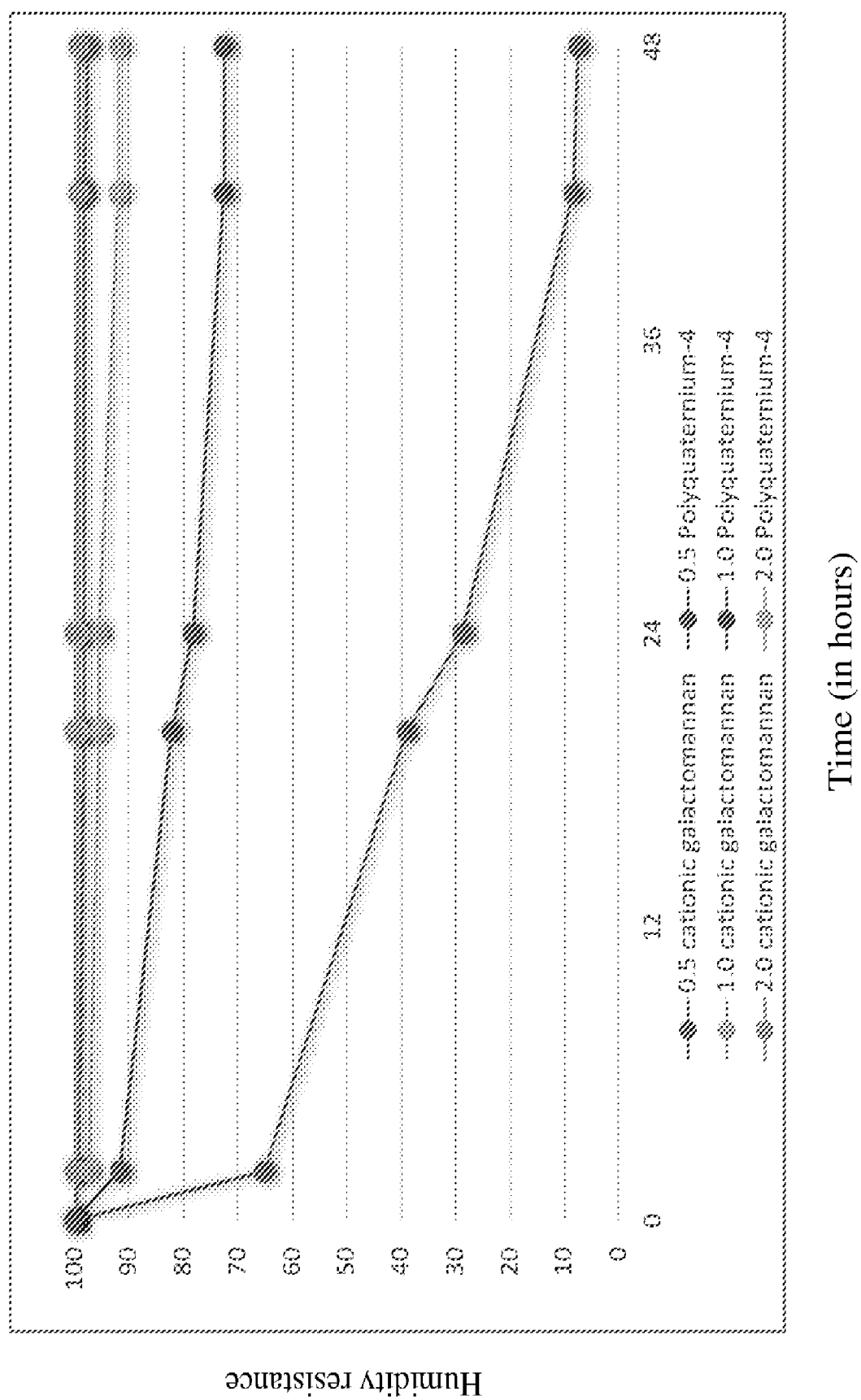
FIG. 5 shows humidity resistance of average percent curl of cationic galactomannan and polyquaternium-4 as a function of time.

Example 14: Comparative Example of Guar Hydroxypropyltrimonium Chloride Vs Styling Polymer (Polyquaternium-4-Quarternized Hydroxyethylcellulose) Mw 300-500 KDa Humidity resistance—0.30 g mousse was applied to clean damp tress (International Hair Importers; Dark brown European, 2.0 g, 1.0" wide, 6.5" length) and rolled diagonally on 0.625" roller, dried under diffuse heat and equilibrated to 40 RH, 25° C. Roller was removed, and the tress was hung on horizontally lined board marked in 0.25" delineations and placed in high humidity environment (90RH, 27° C.). Initial reading for tress length was measured at the bottom of the curl. Additional readings were taken over 24 hrs and are shown in FIG. 2. Humidity resistance was calculated by the following equation: (FIG. 5)

(Lo–Lt/Lo–Li)×100 at time t

Where: Lo=length of fully extended hair.
Li=length of hair before exposure (initial)
Lt=length of hair after exposure time (t)

TABLE 2

Humidity resistance

| | Avg. Percent Curl Time (Hours) | | |
|---|---|---|---|
| Ingredients | 0 | 24 | 48 |
| 0.5 cationic galactomannan | 100.00 | 98.26 | 97.42 |
| St dev | | 2.39 | 2.36 |
| 0.5 Polyquaternium-4 | 100.00 | 28.79 | 7.46 |
| St dev | | 23.85 | 4.20 |
| 1.0 cationic galactomannan | 100.00 | 99.20 | 99.20 |
| St dev | | 1.79 | 1.79 |
| 1.0 Polyquaternium-4 | 100.00 | 78.21 | 72.57 |
| St dev | | 16.17 | 18.55 |
| 2.0 cationic galactomannan | | 100.00 | 99.17 |
| St dev | 100.00 | 0.00 | 1.86 |
| 2.0 polyquaternium-4 | | 95.44 | 91.89 |
| St dev | 100.00 | 3.09 | 3.54 |

Stiffness: Cantilever bending studies were carried out with a Texture Analyzer equipped with a custom-designed apparatus. Low density European brown hair tresses (International Hair Importers and Products, Inc.) were used for the studies. Each tress was 1 in. wide, 8.5 in. long, and 3.65 g (all measurements include the wax tab). Treatment was administered by treating a damp (paper towel-dried hair tress) with 1 g of a 1% or 2% solution of polymer at varying relative humidities. The Texture Analyzer tests were conducted in compression mode.

F1 and F10—Maximum force in the 1st and 10th deformation, respectively.

F10/F1—Ratio of maximum forces in the 10th and 1st deformation indication durability of stiffness.

TABLE 3

Stiffness: Cantilever Bending Technique - stiffness quantification

| polymer | | 50 RH | | | 75 RH | | | 99 RH | | |
|---|---|---|---|---|---|---|---|---|---|---|
| % | polymer | F1 | F10 | F10/F1 | F1 | F10 | F10/F1 | F1 | F10 | F10/F1 |
| 1 | cationic galactomannan | 266.17 | 185.5 | 0.69 | 356.03 | 250.32 | 0.7 | 234.9 | 157.77 | 0.67 |
| | St dev | 26.57 | 26.67 | 0.04 | 31.55 | 15.21 | 0.02 | 32.74 | 25.74 | 0.03 |
| | polyquaternium-4 | 304.73 | 174.67 | 0.57 | 355.25 | 190.44 | 0.54 | 199.03 | 109.13 | 0.55 |
| | St dev | 35.21 | 27.63 | 0.04 | 17.65 | 21.14 | 0.04 | 34.95 | 13.46 | 0.05 |
| 2 | cationic galactomannan | 413.4 | 310.2 | 0.75 | 511.73 | 349.91 | 0.68 | 367.63 | 252.93 | 0.68 |
| | St dev | 39.15 | 22.61 | 0.02 | 5.08 | 16.64 | 0.03 | 47.53 | 45.71 | 0.04 |
| | polyquaternium-4 | 518.5 | 334.53 | 0.65 | 474.94 | 331.4 | 0.7 | 330.33 | 179.57 | 0.54 |
| | St dev | 24.89 | 13.58 | 0.05 | 23.42 | 55.99 | 0.13 | 16.87 | 13.94 | 0.02 |

Tack: Product tack evaluated as a function or measuring tack duration, work of adhesion, and tack magnitude using a Texture Analyzer—tack measurements were carried out by placing 200 mg of polymer solution on a 2×2 in. PMMA plate. The evaluation of the polymers was carried by preparing 2% (w/w) solutions in deionized water. The following instrumental parameters were employed for this test: Repeat until count; Pre-test speed—30 mm/s; Test speed—30 mm/s; Post-test speed—30 mm/s: Mode—distance; Distance—0.1 mm, Count—1200; Type—autoforce; Trigger-force—0.5 g; Advanced options—off. The distance was calibrated to 10 mm at the beginning of each test.

TABLE 4

| | Tack | | |
|---|---|---|---|
| n = 3 | Tack Duration (seconds) | Work of Adheshion (grams/second) | Tack Maximum (grams) |
| Cationic galactomannan | 246.83 | 1293.48 | 156.13 |
| St dev | 25.03 | 360.10 | 46.02 |
| Polyquaternium-4 | 588.61 | 4065.20 | 240.63 |
| St dev | 74.87 | 635.54 | 7.88 |

Figure 6:
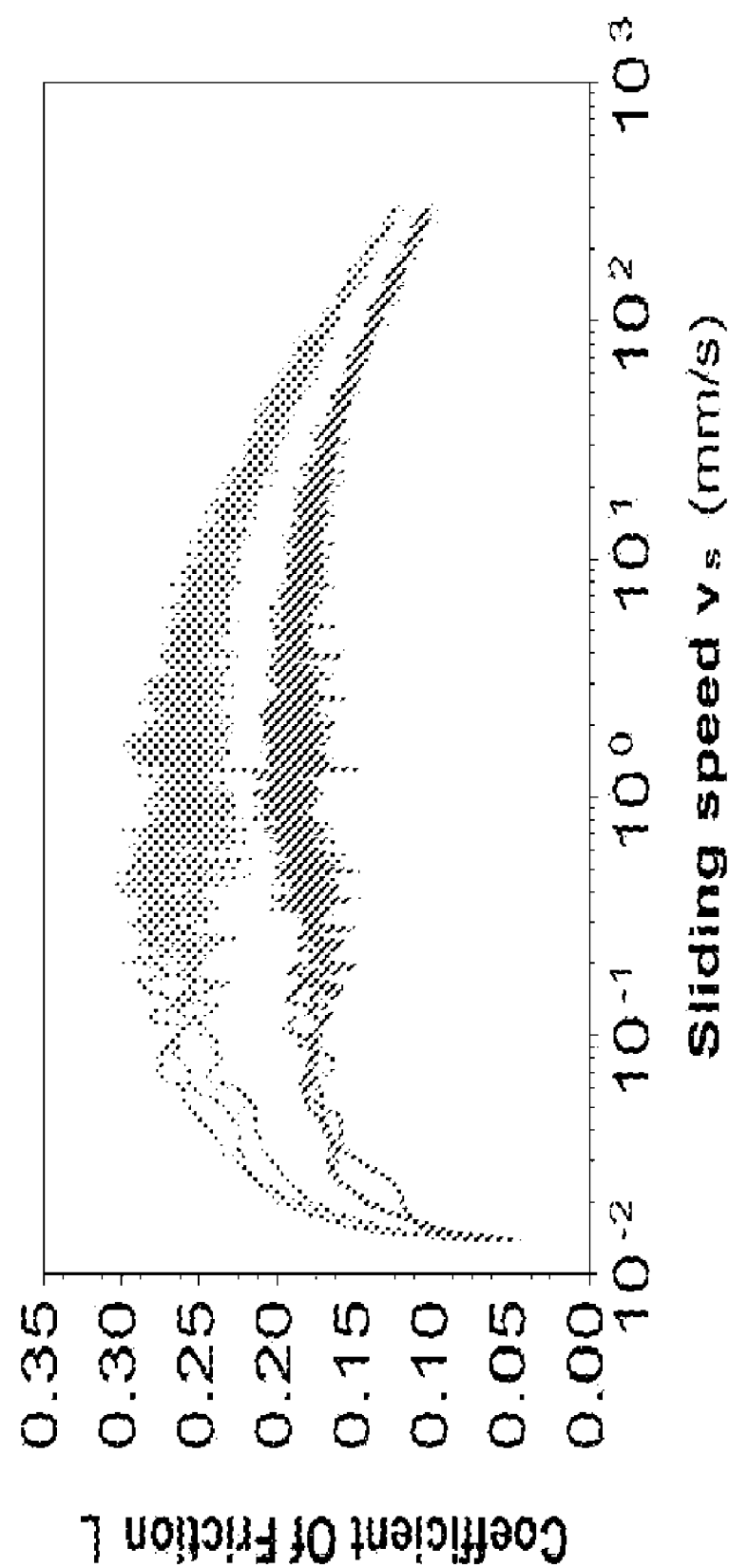
FIG. 6 shows cantilever Bending Technique—stiffness quantification of cationic galactomannan and polyquarterium-4 with texture analyzer equipped with a custom-designed apparatus.

Distribution aesthetics: Slip persistence measured on a rheometer using 3-Balls on plate tribology. Improved aesthetics, or reduction of excess slip, determined through the coefficient of friction. (FIG. 6)

Curl build and maintenance: 0.5 g mousse of Example 1 was applied to damp curly hair tress (International Hair Importers; Mulatto Type B, 3.5 g, 1.75" wide, 6.5" length) and scrunched to accentuate the curl, diffuse dried and evaluated for curl formation and 60 min exposure to high humidity for curl maintenance. Tress exposed to high humidity (90% RH, 27° C.) for 60 minutes and evaluated for curl maintenance (change in amplitude/frequency of the curl and frizz formation). FIG. 1 and Table 1 show the test results that indicate that the addition of CCG-45 delivers a more defined curl (as visually identified by a smaller wave frequency and higher amplitude) and maintained the curl at high humidity exposure.

Figure 7:
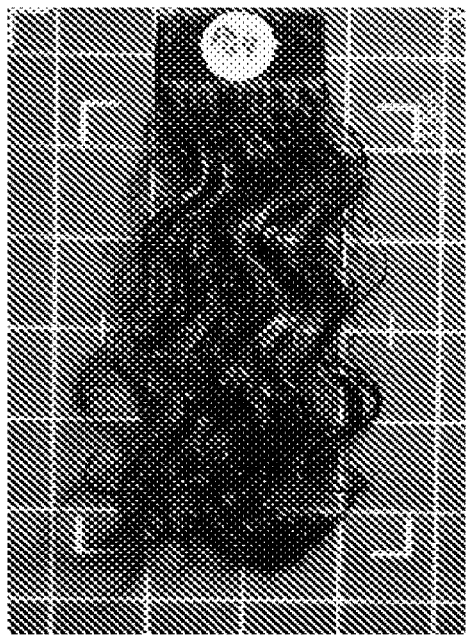
FIG. 7 shows distribution aesthetics of cationic galactomannan and polyquarterium-4 determined through the coefficient of friction.
Figure 7:
Figure 7:
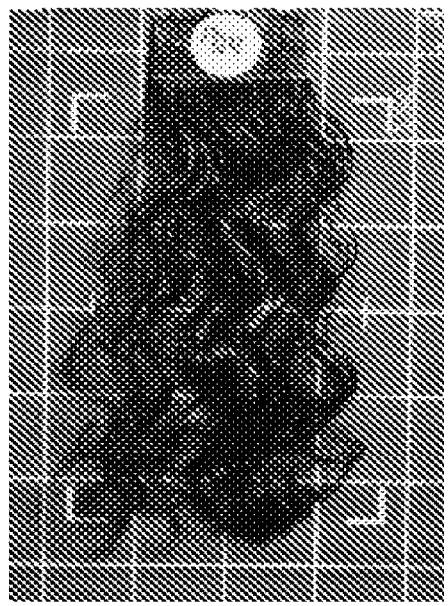
Figure 7:
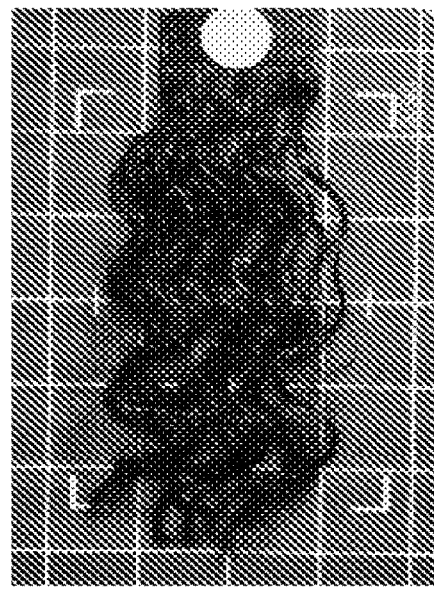

Cationic galactomannan and polyquaternium-4 exhibit enhanced curl formation while the cationic galactomannan provides additional benefits of reduction of hair bulk, and prevention of frizz and curl maintenance at high humidity (FIG. 7)

While the compositions and methods of the disclosed and/or claimed inventive concept(s) have been described in terms of particular aspects, it will be apparent to those of ordinary skill in the art that variations may be applied to the compositions and/or methods and in the steps or in the sequence of steps of the method described herein without departing from the concept, spirit and scope of the disclosed and/or claimed inventive concept(s). All such similar substitutes and modifications apparent to those skilled in the art are deemed to be within the spirit, scope and concept of the disclosed and/or claimed inventive concept(s).

What is claimed is:

1. A hair styling composition consisting of:
   (i) about 0.1 wt. % to about 2 wt. % of; guar hydroxypropyltrimonium chloride having a weight average molecular weight in a range from about 150 to about 700 KDa;
   (ii) about 0.1 wt. % to about 25 wt. % of caprylyl glycol;
   (iii) about 0.1 wt. % to about 10 wt. % of at least one quaternary ammonium compound selected from the group consisting of Polyquaternium-55 and Polyquaternium-11;
   (iv) about 0.1 wt. % to about 10 wt. % of a copolymer of polyvinyl pyrrolidone or a copolymer of vinylpyrrolidone; and
   (v) a sufficient wt. % solvent to achieve 100 wt. % of the hair styling composition, wherein hair treated with the hair styling composition exhibits a curl retention of about 80% to about 100% over a 24-hour period at 90% humidity and 80° F.

* * * * *